(12) United States Patent
Kargman

(10) Patent No.: US 7,603,287 B2
(45) Date of Patent: Oct. 13, 2009

(54) POINT OF PURCHASE DISPLAY ACCESSORY

(75) Inventor: James B. Kargman, Chicago, IL (US)

(73) Assignee: IPDEV Co., Chicago, IL (US)

( * ) Notice: Subject to any disclaimer, the term of this patent is extended or adjusted under 35 U.S.C. 154(b) by 1232 days.

(21) Appl. No.: 10/641,248

(22) Filed: Aug. 14, 2003

(65) Prior Publication Data

US 2004/0133475 A1    Jul. 8, 2004

(51) Int. Cl.
*G06Q 30/00* (2006.01)
*G06Q 50/00* (2006.01)

(52) U.S. Cl. ............... 705/15; 248/442.2; 248/447
(58) Field of Classification Search .......... None
See application file for complete search history.

(56) References Cited

U.S. PATENT DOCUMENTS

| 5,398,905 A | * | 3/1995 | Hinson | 248/442.2 |
| 5,454,721 A | * | 10/1995 | Kuch | 434/127 |
| 5,638,096 A | * | 6/1997 | Schwartz | 248/442.2 |

* cited by examiner

*Primary Examiner*—Matthew S Gart
*Assistant Examiner*—R. Shay Glass
(74) *Attorney, Agent, or Firm*—Schiff Hardin LLP

(57) ABSTRACT

A display accessory for use with a video monitor capable of displaying representations of portions of pizzas of different size which may be ordered by a customer where the representation is displayed true-to-size. Indicia comprising a plurality of concentric shapes is disposed on the display panel corresponding to the sizes of different pizzas available for order. The display panel is attached to the video monitor so that displayed representations of portions of pizza align with at least one concentric shape providing to the customer an indication of the actual size of the pizza.

14 Claims, 5 Drawing Sheets

POINT OF PURCHASE DISPLAY ACCESSORY

BACKGROUND OF THE INVENTION

1. Field of the Invention

The present invention relates to the operation of a restaurant, and in particular to an accessory for use with a video monitor based system which serves to enhance the order taking function of a pizza restaurant toward minimizing errors and maximizing customer satisfaction.

2. The Prior Art

In the past it has sometimes been difficult for a customer to visualize the actual size of the pizza ordered at a pizza restaurant. Pizza restaurants often display on a wall behind the order counter a number of different size cardboard circles corresponding to the different sizes of pizzas offered by the restaurant. In some cases a restaurant might display photographs of the different sizes of pizzas available for order to give the customer an indication of the different sizes of pizzas available at the restaurant.

While displaying plain cardboard circles is intended to convey the relative sizes of pizzas available for order and to permit a customer to compare one size to another, the "samples" are typically displayed at a such a distance from the customer so as to alter the customer's perspective and possibly preclude accurate viewing. Moreover, displaying plain cardboard circles does little to convey the actual pizza the customer intends to order—from the many possible combinations available for order. Further, displaying photographs, while intended to be more informational, similarly may make it difficult for the customer to visualize the actual size of the pizzas, yet alone the exact pizza the customer desires to order.

Therefore it would be an advance in the art to have an apparatus whereby the actual size of the exact pizza the customer wishes to order is presented at the point-of-sale easily viewable by the customer.

One such solution is to provide a system which utilizes a video monitor at the point of purchase which is connected to the point-of-sale system and a video image generator which serves to generate/retrieve and display to the customer a visual image of the exact pizza the customer has configured. Such a solution gives the customer an image of the actual pizza the order taker has entered into the system.

However, one potential drawback of such a system is the reliance on video monitors to convey in real-time the image of the actual pizza being prepared for the customer. In order to display a life-size image of the pizza to the customer, and in particular, a life-size image of each size pizza (small, medium, large and extra large) available for order, the pizza restaurant must invest and utilize video monitors that are larger than the typical consumer monitor. Such monitors take up significant space at the order or point-of-purchase counter, and are very expensive.

Therefore it is an object of the present invention to provide an apparatus for use in association with a video monitor that conveys the actual life-size image even when the video monitor is unable to display the entire pizza in life-size.

It is another object of this invention to provide an accessory for affixation to a monitor which serves to convey to the customer the actual size of the entire pizza in a manner which is easily be visualized by the customer.

It is also an object of the present invention to provide an accessory whereby different sizes of pizzas which are available for order at the restaurant can be visualized on the monitor in cooperation with the accessory so that the customer may confirm and, if necessary, change the size of the pizza ordered to prevent error and to better suit the customer's needs.

It is another an object of the present invention to provide a display mechanism which displays the different sizes of pizzas available for order in an integrated manner which permits ready comparison by the customer and provides a better understanding of the different sizes of pizzas.

These and other objects will become apparent from the specifications, drawings and claims.

SUMMARY OF THE INVENTION

The invention disclosed comprises a display accessory for use with a video monitor capable of displaying representations of portions of pizzas of different sizes which may be ordered by a customer where the representation is displayed true-to-size. A printed display panel is attachable to the video monitor. The display panel bears thereon a plurality of concentric rings which correspond to the different sizes of round pizzas, where the rings align with the portion of the pizza displayed upon the video monitor, thereby conveying to the customer the true size of the pizza ordered. In the preferred embodiment, each of the plurality of concentric rings are of a different color.

The display panel is attachable to the top edge of the video monitor or the front of the video monitor so as to substantially abut the edge of the viewable portion of the video monitor. The display panel may be transparent.

The display accessory used with a video monitor located at the point of purchase at a pizza restaurant may comprise a display panel having a substantially flat forward facing surface and indicia disposed on the front surface representing the outer peripheral portion of the each size pizza available for order by a customer wherein the display panel is attachable to the front of the video monitor so as to be viewable in alignment with images of pizzas displayed on the video monitor toward giving the customer an indication of the actual size of the pizza ordered. The indicia may further include text identifying the size of each pizza available for order.

In another embodiment, a display accessory for displaying the true size of a food item and for use with a video monitor positioned at a customer order station and capable of displaying an image of a portion of a cooked pizza ordered by the customer where the displayed image is true in size is provided. The display panel is attachable to the video monitor so as to be in juxtaposition to at least one edge of the viewable area of the monitor and bears thereon indicia comprising a plurality of concentric shapes corresponding to different sizes of pizzas or other food items available for order by a customer and wherein the center point of the concentric shapes align with the center point of the pizza or food items displayed on the video monitor toward conveying to the customer the true size of the pizza or food item available for order.

The concentric shapes may be printed on the display panel and represent the outer perimeter of the respective sizes of the pizzas available for order and are preferably each a different color. In use, the outer perimeter of one concentric shape aligns with the outer perimeter of the portion of the pizza displayed on the video monitor.

The indicia appearing on the display panel may further include text which conveys to the customer how many people can be fed by each size pizza depicted thereon.

DETAILED DESCRIPTION OF THE DRAWINGS

Figure 1:
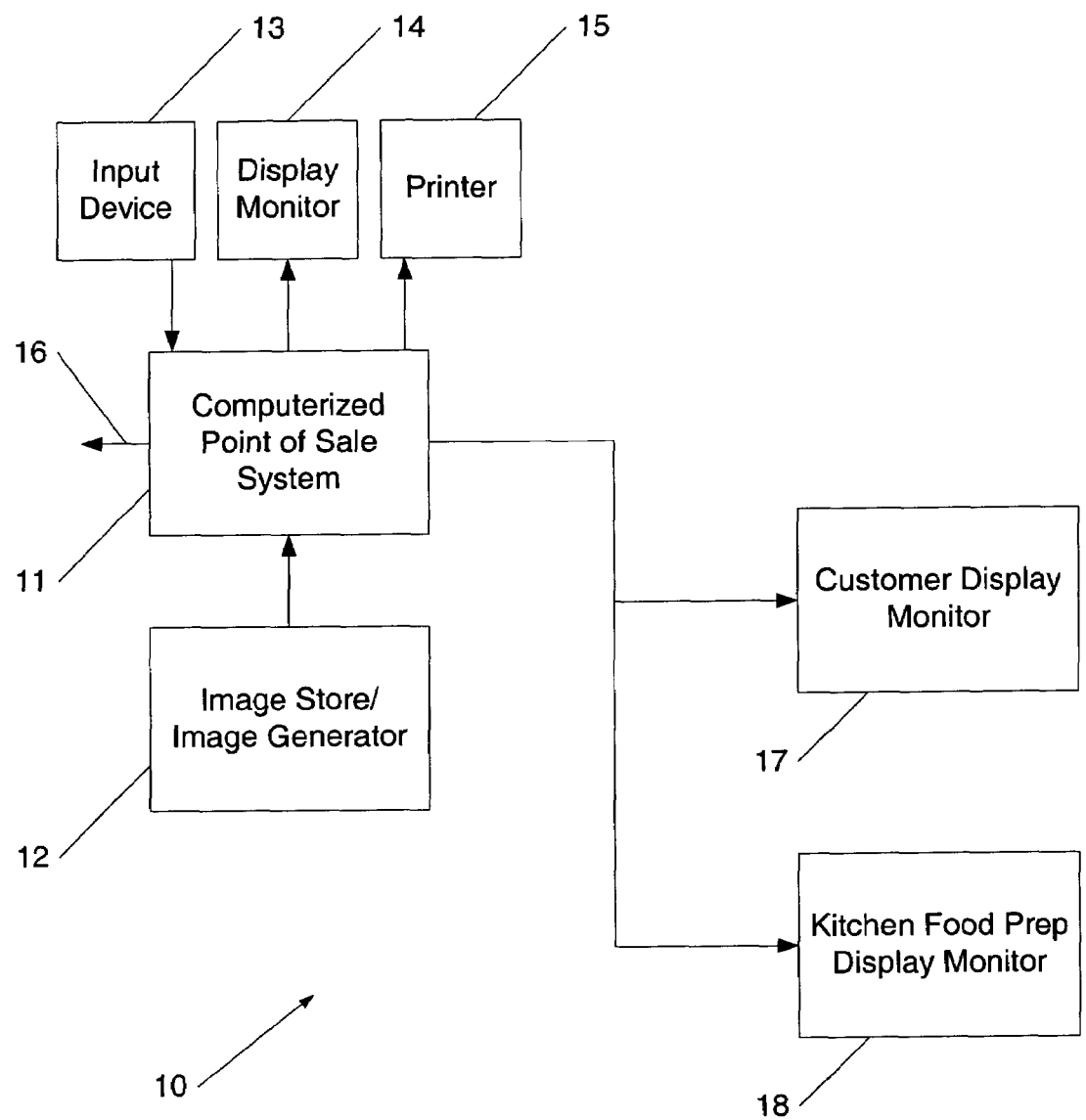
FIG. 1 of the drawings is a schematic representation of one embodiment of a point of sale system with which the present invention may be used to convey a life-size image of a food item ordered by a customer.

While the present invention is susceptible of embodiment in various forms, there is shown in the drawings and will hereinafter be described several embodiments of the invention, with the understanding that the present disclosure is to be considered as an exemplification of the invention, and is not intended to limit the invention to the specific embodiments illustrated.

FIG. 1 illustrates a schematic representation of a point-of-purchase system 10 with which the present display accessory may be used. The system is shown including remote video monitors 14, 17 and 18 connected to a central point-of-sale system 11 located within or otherwise operated by a restaurant.

Point-of-sale system 11 serves to permit entry of customers' food and drink orders. System 10 will be recognized to those skilled in the art as comprising a microprocessor based processor connected to a cash drawer or register, data entry terminal 13, display 14 and printer 15, providing for entry of orders, accepting payments, making change and generating printed receipts for customers. In practice one or more of the various components can be combined into a single device. For example a computerized terminal can include a cash drawer, a display screen 14, a computer keyboard 13, a printer 15 and an integrated microprocessor and software for controlling operation of then system. Point-of-sale system 11 may be located at an order counter staffed by restaurant employees who interact directly with customers placing food orders, or may be configured as a stand-alone terminal used by restaurant waiter and waitress staff.

The point-of-sale system 11 further includes an image storage device and/or image generator 12 which serves to generate images of each of the unique food items which are available for order that are in turn displayed to the customer and/or restaurant employees as further described herein.

The video monitor 17 is connected to the computerized point-of-sale system 11 operated by the restaurant and is positioned so as to viewable by the customer placing an order for food or drink. The monitor may comprise a conventional CRT display or LCD display. Monitor 17 may be integrated into the point-of-sale system 11 or may be external thereto.

A customer who comes into a pizza restaurant steps up to a counter and orders one or more food items by speaking to an order taker. The food order can be for carry-out or for consumption on premises.

To avoid miscommunication between the customer and the order taker, misunderstanding by the customer and to further enhance the sales and restaurant dining experience, monitor 17 is positioned so as to be viewable by the customer during the order placement process. As the order taker enters the customer's order into the point-of-sale system, the computerized point-of-sale system 11 generates a visual image on display 17 which, in turn, presents the customer with a photo-realistic image of a portion of the food item(s) the order taker has noted as being ordered. Alternatively monitor 14 can be used first by the order taker to enter the customer's order and then "swiveled" to be viewed by the customer. If multiple pizzas are ordered, each can be displayed sequentially to the customer.

As an example, a customer may order a large pizza with cheese and pepperoni toppings. In response to the order taker's entries, the system 11 will cause an image of a cooked cheese and pepperoni pizza to appear on display 17. It is preferred that the displayed image be in color so as to accurately convey as much information as possible.

The image displayed to the customer need not be limited to depicting only the finished pizza, but may also depict the pizza being assembled for cooking. In the later case the pizza is "built-up" step-by-step or ingredient-by-ingredient, as they are specified by the customer and entered into the system by the order taker toward displaying the image of the complete cooked pizza.

Figure 2:
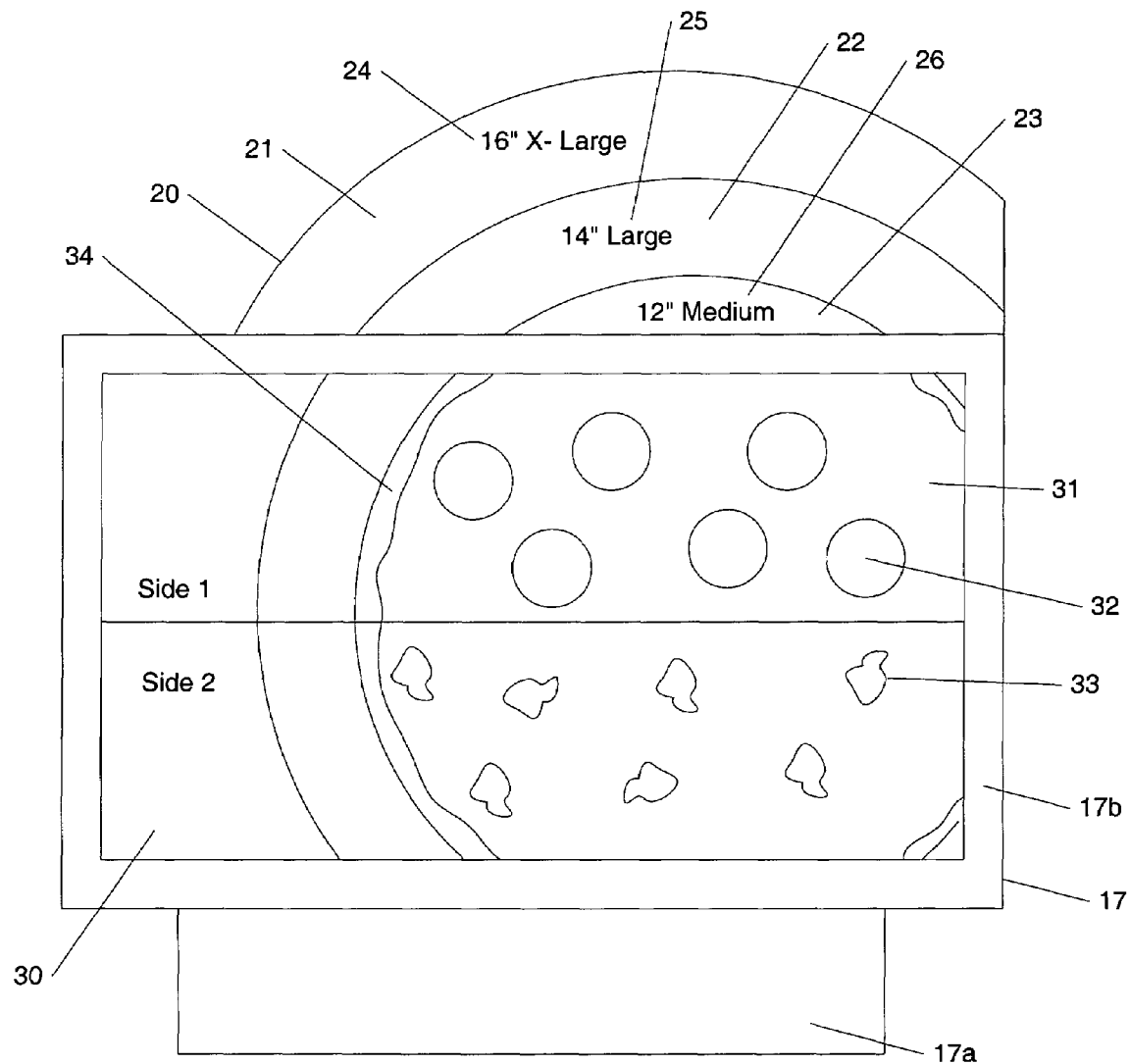
FIG. 2 illustrates one embodiment of the present invention as comprising a display panel bearing indicia which illustrates different sizes of pizzas which is attached to the top of the video monitor.

FIG. 2 illustrates the use of a the present display apparatus shown comprising a display panel 24 which is used in association with monitor 17 in order to visually extend the partial image displayed on monitor 17 so as to give the customer the appearance of the true size of the pizza where monitor 17 is too small to display a life size image of the entire pizza.

In particular, FIG. 2 illustrates a portion of a pizza 31 displayed on a monitor 17 as a photo-realistic image that is located at the point of purchase by the customer. The image displayed to the customer must be displayed large enough to reveal and convey the composition and details of the pizza which the order taker has entered into system 11, to in turn, permit the customer to easily view and confirm the order. As such, it is preferred that only a portion of the overall pizza is displayed in life-size view.

Customer video monitor 17 is shown comprising a base portion 17a and a front bezel 17b which encircles the viewable portion of the display. Display panel 24 is shown in FIG. 2 as attached to the top portion of the housing of monitor 17. Display panel 24 is preferably constructed of cardboard or plastic or other rigid material. Upon the front face of panel 24 appears printed indicia, which in the context of a pizza restaurant, comprises a series of concentric circles or rings which depict the sizes of the different pizzas offered for sale, and in particular, the outer perimeter portion of each size pizza. In the illustrated example, a sixteen inch "extra-large" round pizza is depicted by the outer-most circle 21 which includes textual indicia 24. A fourteen inch "large" round pizza is depicted by circle 22 which includes textual indicia 25, and a twelve inch round pizza is depicted by the center-most circle 23 which includes the textual indicia 26. Each of circles 21-23 are true to size so as to illustrate a life-size image and when used as described herein serves to give the customer an accurate impression of the overall true-to-life size of each pizza.

In one embodiment of the present invention regions 21-23 are each printed on display panel 20 in a different color or shade of color so as set each apart from the other. In one embodiment, the inner-most circle is red in color, the next is green and outer-most is orange.

Video monitor 17 is shown displaying a life-size image 31 of a portion medium size pizza. Image 31 is further displayed on monitor 17 concentric with each of circles 21-23 such that the outer edge of the displayed pizza 31 aligns with the outer perimeter of circle 23.

The displayed image 31 is preferably a photo-realistic image of the pizza which the restaurant order taker has entered into system 11 based upon the customer's order. As shown, image 31 may provide significant detail to the customer, where for example, each individual ingredient or topping, such as pepperoni 32 or sausage 33 may be shown, along with details of the pizza crust 34. A center-line may also be displayed to designate one-half of the pizza from the other.

The center point of the concentric circles or rings 21-23 align with the center point of the pizza displayed on monitor 17, such that the outer perimeter of at least one circle or ring 21-23 aligns with the outer perimeter of the portion of the pizza 31 displayed on the video monitor toward conveying to the customer the true size of the pizza available for order.

Figure 3:
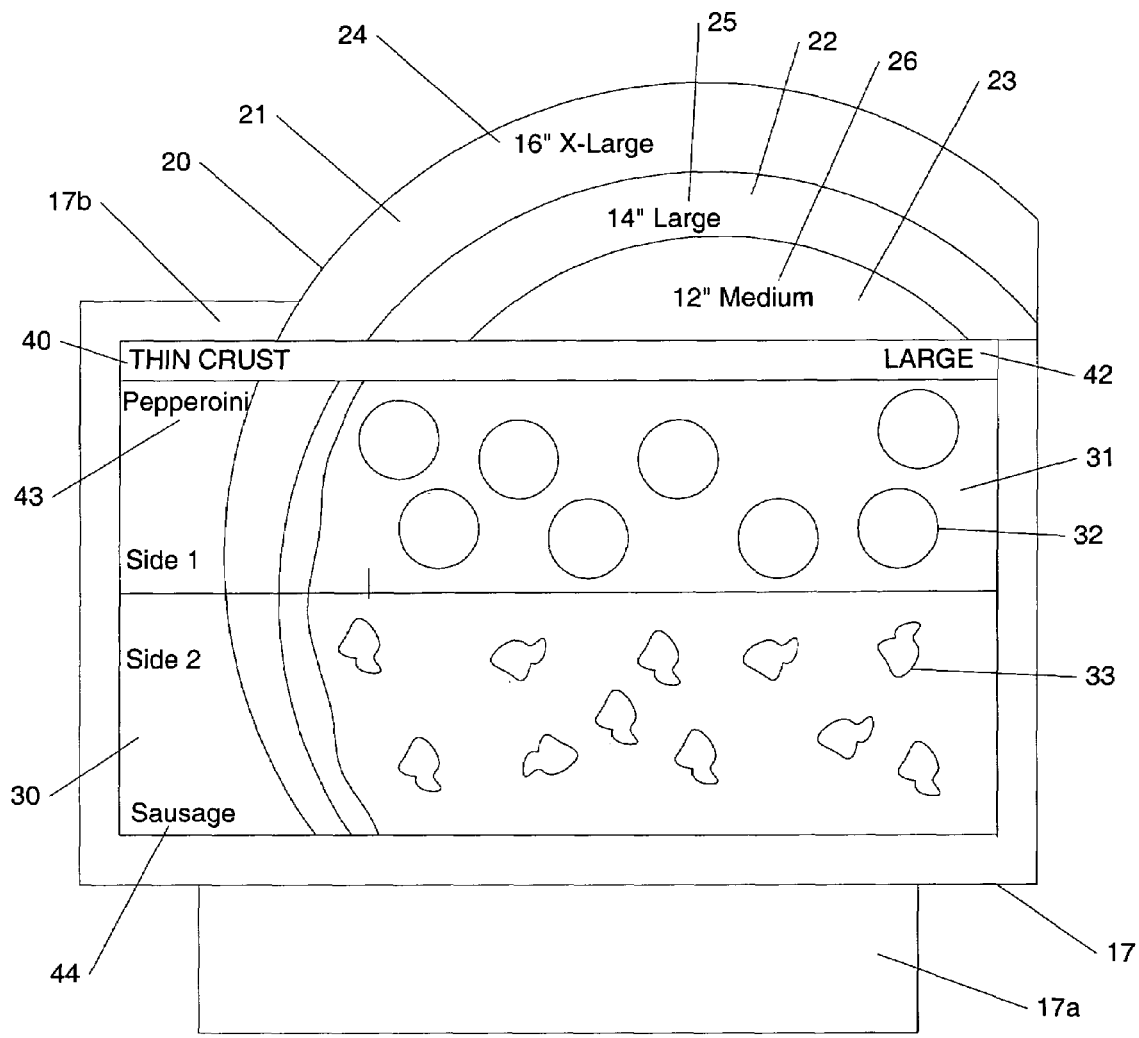
FIG. 3 illustrates another embodiment of the present invention as comprising a display panel bearing indicia which illustrates different sizes of pizzas which is attached to the front of the video monitor proximate the viewing area.

FIG. 3 of the drawings illustrates a further embodiment wherein display panel 20 is affixed to the front bezel 17b of monitor 17 whereby a more seamless transition exists between the displayed image 31 and the indicia printed on panel 20. In this example, a large size pizza is depicted by image 31 as having been ordered by the customer. It can be seen that the perimeter of image 31 aligns with the outer perimeter of circle 22. It is further contemplated that area 30 abutting image 31 may be displayed in a color which corresponds to the color of the next larger size circle, or each circle, appearing on panel 20 so as to further off-set the displayed image and promote the melding of the displayed image 31 and the corresponding size circle printed on panel 20.

As further illustrated, the generated display may also include a banner 40 which provides to the customer textual indicia confirming the type and size of the pizza ordered and displayed. Moreover, the generated image may include textual indicia 43 and 44 which identify the ingredients or toppings appearing on the displayed image 31. The display can further include indicia or captions which convey to the customer how many people the pizza as ordered will typically feed.

Figure 4:
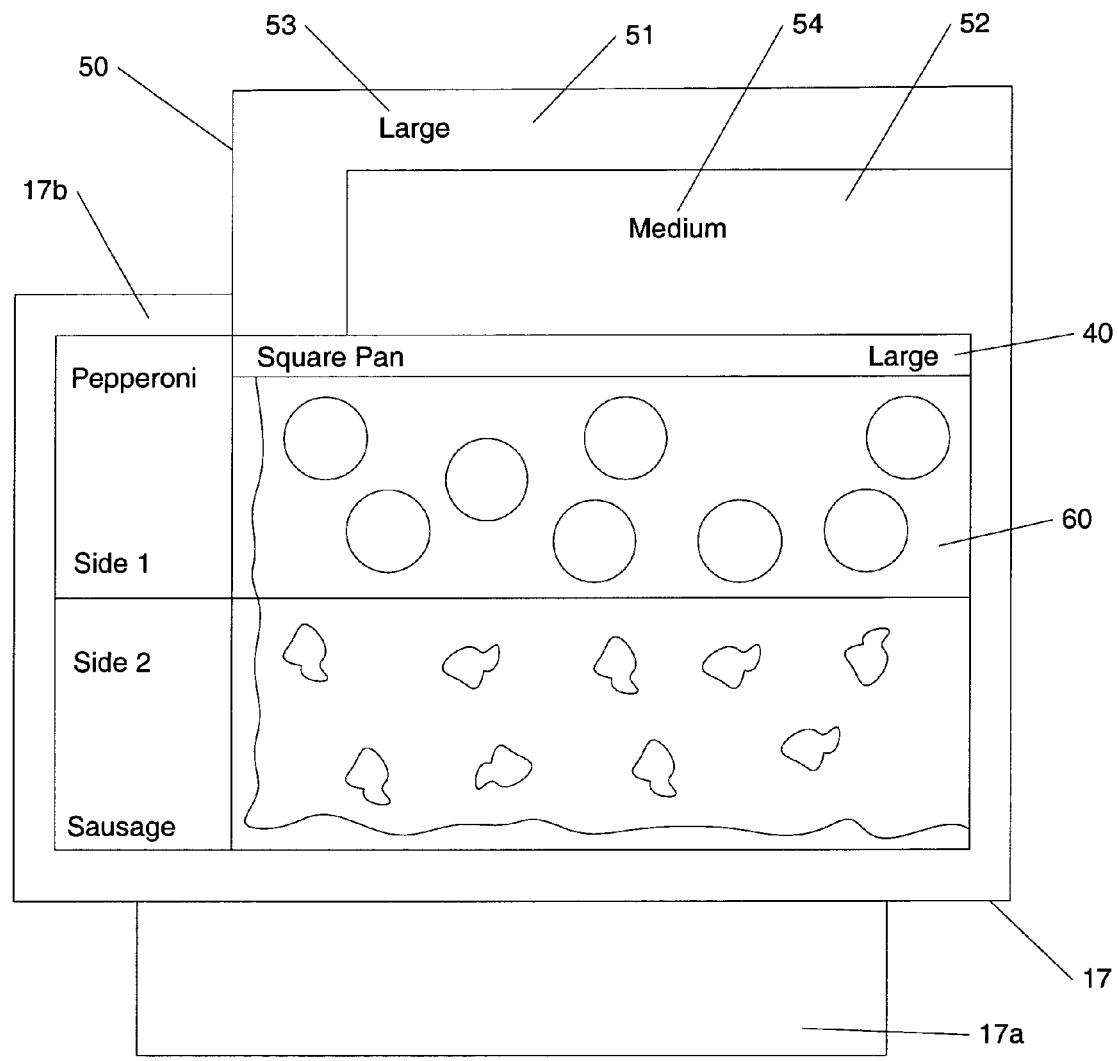
FIGS. 4 and 5 illustrates further embodiments of the present invention as comprising a display panels bearing indicia which illustrates shapes of pizzas.

FIG. 4 of the drawings illustrates a further embodiment of the present invention wherein square or rectangular pizzas are displayed on monitor 17 and depicted on display panel 50. Display panel 50 is shown affixed to the front display bezel 17b of video monitor 17. Instead of circular shapes rectilinear shapes or regions 51 and 52 are shown. These shapes or regions are also preferably colored to set them apart from each other. The illustrated embodiment depicts two sizes, medium and large. Image 60 displays a large square pan pizza, as further confirmed by banner 40 and the text displayed therein. As shown, the outer edge/perimeter of the pizza of image 60 aligns with outer edge/perimeter of the region 51 thereby conveying to the customer the actual size of the pizza ordered.

Figure 5:
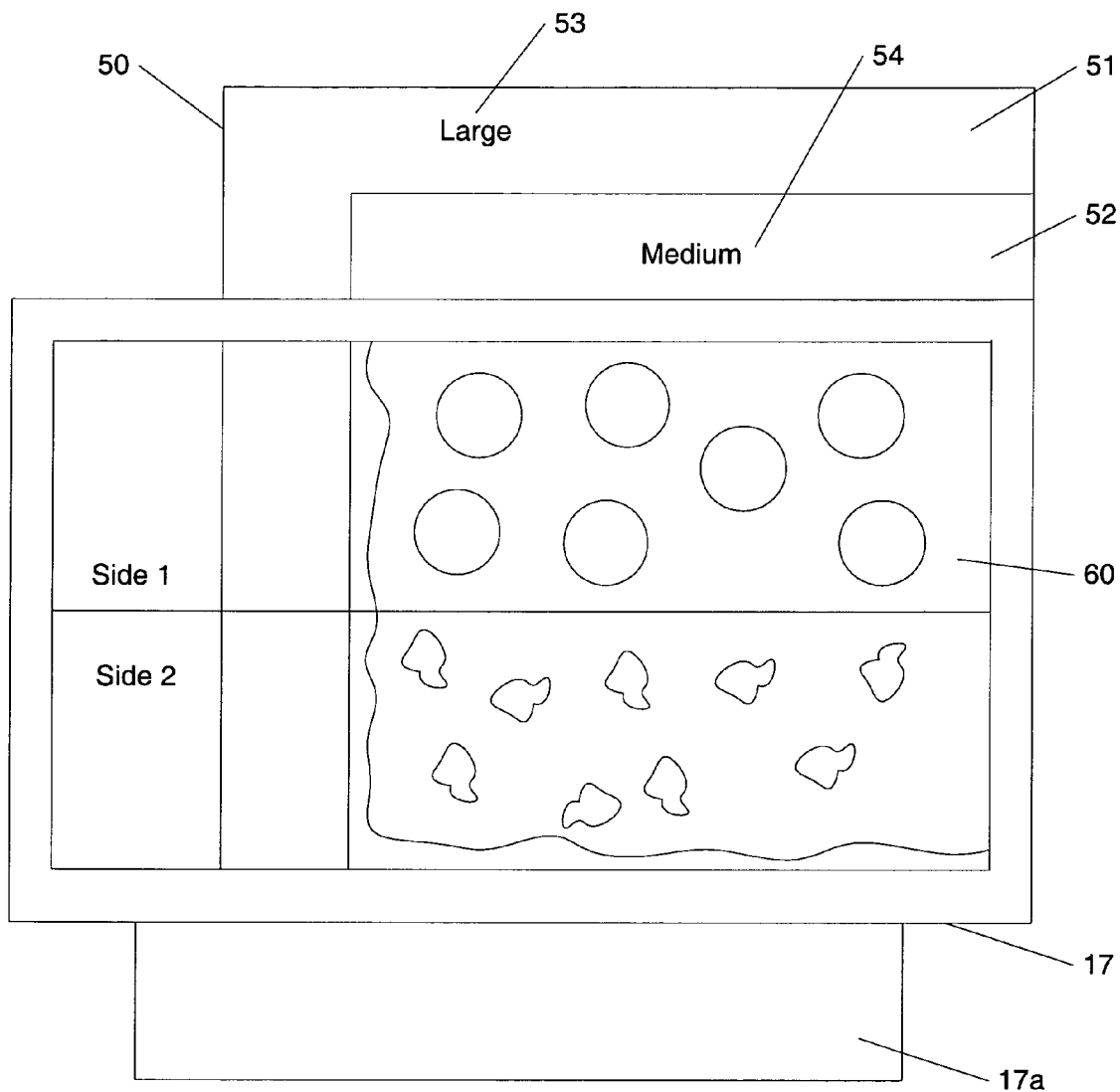

FIG. 5 of the drawings illustrates an embodiment wherein a medium size square pizza is displayed on monitor 17 and depicted on display panel 50. As shown, the outer edge of the pizza of image 60 aligns with outer edge of the region 52 thereby conveying to the customer the actual size of the pizza ordered.

While the display panel 20 is shown as a "half-moon" shape and display panel 50 is shown as a rectilinear shape, display panels 20 and 50 can also be configured to display the remaining portion of the entire periphery of the pizza and may thereby extend along the right side and bottom side edges of monitor 17, if necessary.

Display panels 20 and 50 attached to monitor 17 and may also contain text or other indicia to convey to the customer current "special offers" which may be available on other food or drink items. As such, the display panels 20 and 50 are preferably readily and inexpensively interchangeable.

The display panels 20 and 50 may be attached to monitor 17 by many means known to one skilled in the art. For example, two-sided tape or clips may be used. No matter what means are used to attach the frame to monitor 17, when in use, it is preferred that there be a smooth transition between the photo-realistic picture displayed on monitor 17 and the images printed on display panels 20 and 50.

While photo-realistic images are contemplated as being displayed on monitor 17 the images need not be so detailed. For example, the pizza ordered may be displayed using colored shapes which correspond to and/or contrast with any of the regions 21-23 and 51-52 appearing on display frames 20 and 50, respectively.

Accordingly, as can be seen, if the entire full view of a extra-large size pizza were displayed on a conventional 15 inch monitor it is unlikely the customer would be able to discern the details of their order and would be unable to accurately confirm that their order had be taken correctly, or that they indeed ordered that which they had intended. Thus, if a customer initially specifies one size pizza and during the order process changes his or her mind and specifies a larger or smaller pizza, the video monitor will re-generate and re-display the images of the portion of the pizza and the frame and monitor reflect to the updated order. The foregoing use of a display panel at a customer order station provides great benefit to both the customer and the restaurant by providing a mechanism for catching mistakes and enhancing customer satisfaction.

The present invention while described in the context of a pizza restaurant can further be applied to restaurants serving other food items capable of being ordered in varying sizes for in-store dining, carry out, or delivery. In addition, the customer monitor 17 and display panels 20 and 50 may also be positioned in a drive-through lane of a fast-food restaurant, or at a stand-alone kiosk should one be provided for a customer to order and pay for food and drink without interacting with any restaurant employee. In addition, monitor 18 and display panels 20 and 50 may be used in other areas of a restaurant, such as the make-line or food preparation area where the raw ingredients of a pizza are assembled on a pizza crust by food preparation employees for cooking in the oven.

The foregoing description and drawings merely explain and illustrate the invention and the invention is not limited thereto, as those skilled in the art who have the disclosure before them will be able to make modifications and variations therein without departing from the scope of the invention.

What is claimed is:

1. A display accessory used with a video monitor, comprising:
   a video monitor capable of displaying representations of portions of pizzas of different sizes which may be ordered by a customer where the representation is displayed true-to-life-size;
   a printed display panel attached to the video monitor; and
   the display panel bearing therein a plurality of concentric rings corresponding to the different sizes pizzas wherein the rings align with the portion of the pizza displayed upon the video monitor, thereby conveying to the customer the true life size of the pizza ordered.

2. The display accessory of claim 1, wherein each of the plurality of concentric rings are of a different color.

3. The display accessory of claim 1, wherein the display panel is attached to the top edge of the video monitor.

4. The display accessory of claim 1, wherein the display panel is attached to the front of the video monitor so as to substantially abut the edge of the viewable portion of the video monitor.

5. The display panel of claim 1, wherein the display panel is transparent.

6. A display accessory used with a video monitor located at the point of purchase at a pizza restaurant, comprising:
   a video monitor operable to display images of pizzas;
   display panel having a substantially flat forward facing surface;
   indicia disposed on the front surface of the display panel representing the outer peripheral portion of the each size pizza available for order by a customer;
   the display panel being attached to the front of the video monitor so as to be viewable in alignment with images of pizzas displayed on the video monitor to represent to the customer a size corresponding to the actual life size of the pizza ordered.

7. The graphic display of claim 6, wherein the indicia comprises colors corresponding to each different size pizza available for order.

8. The graphic display of claim 6, wherein the indicia comprises text identifying the size of each pizza available for order.

9. A display accessory for displaying the true size of a food item and used with a video monitor, comprising:
   a video monitor positioned at a customer order station and capable of displaying an image of a portion of a cooked pizza ordered by the customer where the displayed image is true-to-life size;
   a display panel attached to the video monitor so as to be in juxtaposition to at least one edge of the viewable area of the monitor; and
   the display panel bearing thereon a indicia comprising a plurality of concentric shapes corresponding to different sizes of pizzas available for order by a customer and wherein the center point of the concentric shapes align with the center point of the pizza displayed on the video monitor toward conveying to the customer the true life size of the pizza available for order.

10. The display accessory according to claim 9, wherein the concentric shapes represent the outer perimeter of the respective sizes of the pizzas available for order.

11. The display accessory according to claim 9, wherein the plurality of concentric shapes are each a different color.

12. The display accessory according to claim 9, wherein the plurality of concentric shapes are printed on the display panel.

13. The display accessory according to claim 9 wherein the outer perimeter of one concentric shape aligns with the outer perimeter of the portion of the pizza displayed on the video monitor.

14. A display accessory for displaying the true size of a food item and used with a video monitor, comprising:
   a video monitor positioned at a customer order station and capable of displaying an image of a portion of a food item ordered by the customer where the displayed image is true-to-life size;
   a display panel attached to the video monitor so as to be in juxtaposition to at least one edge of the viewable area of the monitor; and
   the display panel bearing thereon a plurality of concentric shapes corresponding to different sizes of a food item available for order by a customer and wherein the center point of the concentric shapes align with the center point of the food item displayed on the video monitor, the concentric shapes being the true life size of the various sizes of the food item available for order.

* * * * *